July 25, 1967 H. WADHAM 3,332,628
METHOD OF AND APPARATUS FOR MIXING, GRINDING, DISPERSING OR
DISSOLVING MATERIALS COMPRISING SOLID PARTICLES IN A LIQUID
Filed May 25, 1964 2 Sheets-Sheet 1
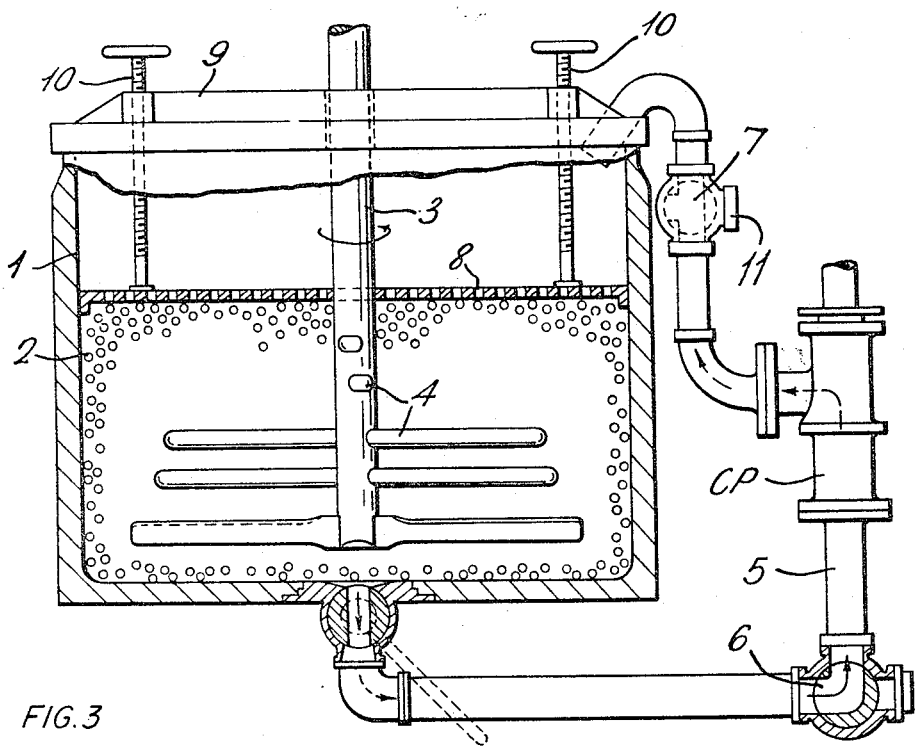
FIG. 1.
FIG. 1a.
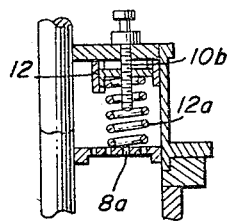
FIG. 3
Inventor
Henry Wadham
By Cushman, Darby & Cushman
Attorneys

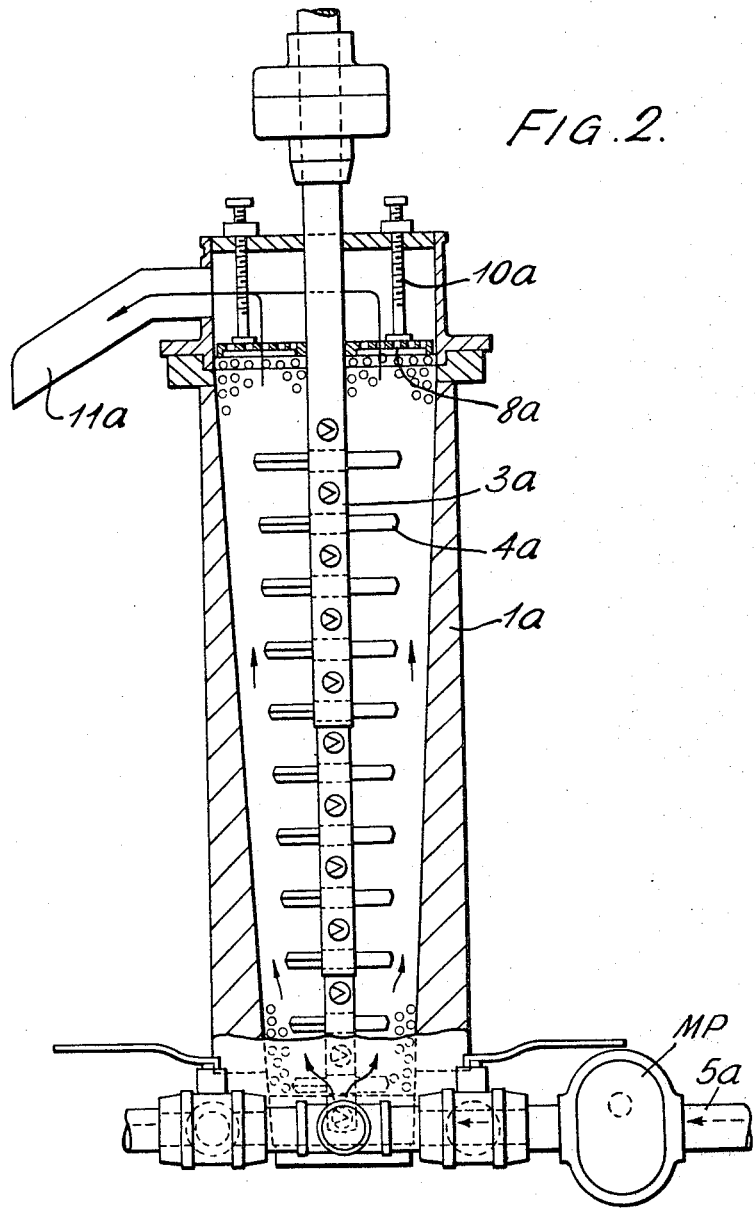

United States Patent Office 3,332,628
Patented July 25, 1967

3,332,628
METHOD OF AND APPARATUS FOR MIXING, GRINDING, DISPERSING OR DISSOLVING MATERIALS COMPRISING SOLID PARTICLES IN A LIQUID
Henry Wadham, 8 Beechwood Ave., Hanham, Bristol, England
Filed May 25, 1964, Ser. No. 369,945
Claims priority, application Great Britain, May 23, 1963, 20,600/63
10 Claims. (Cl. 241—30)

The present invention relates to a method of and apparatus for mixing, grinding, dispersing and dissolving materials comprising solid particles in a liquid, wherein the material while being treated is held in or passed through a vessel containing a multiplicity of discrete elements which are kept in random motion, e.g., by continuous rotary or oscillatory motion of the vessel and/or means within the vessel. The said elements may be for example, natural or man-made elements, e.g., balls, pebbles, cylinders or as provided by the use of certain varieties of sand such as Ottawa sand.

The elements may be activated random fashion in various ways, e.g., by tumbling or cascading in a rotating vessel or cylinder rotating at a calculated speed as in the ordinary ball mill or by rotating and/or oscillating an arm or arms as in a Szegvari attritor, or a disc or discs spoked or not as in the so-called sand-grinder, in the vessel containing the elements and the material.

Hitherto the volume of the mass of elements has been chosen in accordance with the viscosity of the material to be treated and the speed of rotation or oscillation. The size and form of the elements have to be carefully chosen and the viscosity of the material controlled in order that the elements shall be effective in operation.

We have found that under normal conditions there is a tendency for the elements to float apart in the liquid phase and to become less effective in treating the material, and particularly when this is of a heavy or viscous character such as a paste, paint or litho ink, and the object of the invention is to provide a method and means whereby the contact or close proximity of the elements with or to one another can be more effectively controlled and efficiency of action improved irrespective of the viscosity of the material. A further object is to promote the use in certain cases of smaller elements and consequent increase in the number of contact points and the shortening of the time necessary for equivalent treatment of the material and permit the effective treatment of viscous materials which it would be otherwise difficult or not possible to treat.

The apparatus according to the present invention comprises a vessel containing the mass of elements, means for activating the said elements and means for controlling the working volume of the vessel.

The said means may be constituted by an adjustable wall of the vessel and may take the form of a screen which allows the material to pass but not the elements. This wall or screen may be adjusted to an operative position when the working volume is no greater than or very little exceeds that occupied by the mass of the elements in contact with one another and the voids they then create so that the elements cannot float apart in the material and may even be adjusted to apply some pressure to the mass of contacting elements.

Even elements in the form of grains of sand may be thus held in contact or close proximity with the neighbouring grains and be prevented from floating apart during operation.

The apparatus allows of adjustment of the wall or screen to allow the elements a natural or greater freedom during the initial stages of the operation and for subsequent adjustment to bring the wall or screen into the said operative position and this method of operation makes starting easy and permits smaller motive power units to be employed than would otherwise be possible.

Volume control as aforesaid may be by mechanical means, such as adjustable screw means, by hydraulic or pneumatic means and if desired through the medium of suitable spring loading.

In the case of the more viscous materials it will generally be desirable to adjust the wall or screen after the initial period of running so that the working volume shall be the minimum but when less viscous materials are to be treated adjustment may be such as to permit the working volume to be somewhat larger than the minimum volume of the mass of the elements and the voids created thereby, although it is still highly desirable that the wall or screen should be so positioned or retracted as to enlarge the working volume for starting and during the early stages of the operation and then to make the adjustment to reduce the said volume to that required for optimum operation.

The specific gravity of the elements is less important with the present method than hitherto and elements in the form of porcelain or steatite or other ceramic balls may be employed satisfactorily where otherwise heavier balls such as of steel would be needed and even with particularly heavy or viscous liquids and moreover the discoloration of the material incident to the use of steel balls can be obviated.

The invention will now be described more particularly and by way of example to embodiments in which it is applied to batch and continuous attritors. In the accompanying drawings, FIGURE 1 is a vertical cross-sectional view of one embodiment of apparatus according to the invention portions being shown in elevation and FIGURE 1a is a fragmentary cross-sectional view of one part thereof;

FIGURE 2 is a similar view to FIGURE 1 of another embodiment;

FIGURE 3 is a fragmentary sectional view of a modification.

The batch attritor shown in FIGURE 1, comprises a vessel 1 containing the elements 2, e.g., in the form of balls of a diameter between ⅛″ or even less and ⅜″ or pebbles of a commensurate size. A rotary shaft 3 is mounted to rotate on the axis of the vessel and carries a series of arms 4 which may be radial or not and may vary inter se in length in well known manner, following the well-known Szegvari attritor.

The apparatus may comprise a circulating pump CP in a line 5 including a valve 6 through which a pre-mixed material may be drawn into the pump and discharged thereby along the line 5 through the valve 7 into the top of the vessel.

The volume of the working space in the vessel is controllable by an adjustable screen 8 which is constructed so as to allow the material to pass through it but not the elements. The vessel may be provided with a cover, e.g., a hinged cover 9 and this may carry fine screw means 10 connected to the screen, so that when the cover is closed the screen may be adjusted in the axial direction of the vessel. Screws with handwheels are illustrated but the desired adjustment of the screen may be effected by any other suitable means, e.g., by pneumatic or hydraulic control.

The circulating pump facilitates charging and discharging of the vessel and it may be kept in operation during a working cycle to maintain the material in continuous circulation, although in simpler forms of the apparatus, the circulating pump is omitted and the material can be loaded into the top of the vessel and drained off from the bottom, and if desired, the screen may be so fitted that it can be removed for charging. The shaft may be rotated continuously or oscillated.

The operation of the machine illustrated in FIGURE 1 is as follows:

The screen is adjusted to its operative position. A pipe is led from valve 6 to a premixer containing premixed material. The valve 6 is then in position to close off the bottom of the vessel and allow the pump to draw premix and deliver it past the valve 7 into the top of the vessel. A metered quantity of the premix sufficient to fill the voids is thus delivered into the vessel and the valve 6 is closed from the premix supply.

The screen is then retracted by operation of screws 10 and the shaft 3 set in operation, and thus operating without requiring high starting torque, and after a predetermined initial period of operation and when the elements have been sufficiently activated and the solids in the material sufficiently wetted, the screen is readjusted to the position indicated in FIGURE 1 in which the working volume of the vessel is totally occupied by the mass of elements in contact with one another and the material in the voids formed thereby or nearly so or the elements will be in sufficiently close proximity with one another and an efficient motor load selected, while the rotary or oscillatory motion of the shaft continues. The material is then acted upon while being circulated by the pump until it has been sufficiently treated.

Valve 7 can then be opened to the discharge outlet 11 and the treated material pumped out of the vessel and delivered to an appropriate receiver. The material could alternatively be drained past the valve 6.

During the life of the elements they will wear with consequent tendency undesirably to float in the liquid material, but the screen can be adjusted to counteract this or may, if desired, be under spring load so as automatically to compensate therefor.

The screen may be backed by a perforated plate and act piston fashion.

The vessel may be arranged in usual manner to tilt for complete discharge of the vessel when necessary.

The embodiment shown in FIGURE 2 is a continuous Szegvari attritor employing an elongated cylindrical or conical or part-conical vessel 1a and a rotary or oscillating shaft 3a carrying arms 4a, the screen 8a being adjustable as in the case of the batch machine after an initial period of operation by screw means indicated diagrammatically at 10a. A metering pump MP is provided which draws in the material, e.g., premixed material, to be treated at 5a and continuously feeds it through the apparatus with the material passing through the screen and discharging through the outlet 11a.

FIGURE 3 shows how the screen wall, e.g., 8a, can be adjusted through spring means 12a, by the screw 10b displacing a nut 12 suitably guided against rotation, the spring means permitting yielding of the screen wall during operation of the apparatus.

Again after initially priming the apparatus and running with the screws slackened and the screen somewhat retracted, and with the pump stopped, the screen may be adjusted so that the mass of elements and the liquid in the voids created thereby fill the working volume of the vessel when the pump is operated to cause the material to be fed continuously through the apparatus and discharged via outlet 11a while the shaft 3a is maintained in operation.

What I claim is:

1. In the method of mixing, grinding, dispersing or dissolving treatment of liquids containing solid particles, wherein the liquid material is contained in or passes through a vessel containing a mass of discrete elements and these elements are activated in random motion to act on the said material, the steps which comprise causing the mass of elements to be activated while the volume of the working space is sufficiently large to allow a certain freedom of movement of the said elements away from one another and then contracting the said volume and continuing the treatment while the elements are still being activated but are maintained in close or contacting proximity with one another.

2. The method according to claim 1, in which the working volume of the vessel is contracted, after an initial period of operation, so that the said volume during the rest of the working period, is reduced to that whereby the said volume will be totally occupied by the mass of the elements in contact with one another and the liquid in the voids created thereby.

3. The method according to claim 2, in which the volume is sufficiently contracted by a yieldable moving wall of the vessel that the mass of elements are held in contact and under pressure.

4. Apparatus for mixing, grinding, dispersing or dissolving treatment of liquid containing solid particles, comprising a vessel containing a mass of discrete elements, means for activating the said elements and adjustable means for varying the working volume of the vessel; said latter means being adjustable in relation to the mass of elements in the vessel so that the working space can be reduced substantially to the volume of the mass of the elements in contact with one another and the voids created thereby while the said activating means are in operation.

5. Apparatus according to claim 4, in which the said adjustable means comprise a displaceable screen wall which allows the liquid material to pass but holds back the elements.

6. Apparatus according to claim 4, in which the said means for activating the elements comprise a rotatable shaft provided with outwardly projecting parts.

7. Apparatus according to claim 4, in the form of a batch treatment apparatus comprising means for circulating the liquid material whilst the elements are activated in the vessel.

8. Apparatus according to claim 4, comprising means for continuously passing liquid material through the vessel while the elements are activated.

9. Apparatus according to claim 4, comprising screw means operable from externally of the vessel for adjusting the said adjustable means.

10. Apparatus according to claim 4, in which said adjustable means is a yieldingly mounted wall in the form of a screen.

References Cited
UNITED STATES PATENTS

| | | | |
|---|---|---|---|
| 1,361,280 | 12/1920 | Newhouse | 241—70 |
| 1,517,538 | 12/1924 | Daman | 241—179 X |
| 1,956,293 | 4/1934 | Klein | 241—172 X |
| 2,432,610 | 12/1947 | Dryer | 241—286 X |
| 3,055,600 | 9/1962 | Barkman | 241—69 X |
| 3,149,789 | 9/1964 | Szegvari | 241—27 |
| 3,212,722 | 10/1965 | Maeder | 241—69 X |

WILLIAM W. DYER, JR., *Primary Examiner.*

HARRY F. PEPPER, JR., *Examiner.*